(12) United States Patent
Takano et al.

(10) Patent No.: US 6,772,942 B2
(45) Date of Patent: Aug. 10, 2004

(54) ARITHMETIC CIRCUIT TO INCREASE THE SPEED OF A MODULAR MULTIPLICATION FOR A PUBLIC KEY SYSTEM FOR ENCRYPTION

(75) Inventors: Kohji Takano, Yamato (JP); Akashi Satoh, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/023,147

(22) Filed: Dec. 18, 2001

(65) Prior Publication Data

US 2002/0074391 A1 Jun. 20, 2002

(30) Foreign Application Priority Data

Dec. 19, 2000 (JP) ........................................ 2000-386069

(51) Int. Cl.[7] ................................................ G06F 11/10
(52) U.S. Cl. .................................... 235/61 R; 708/490
(58) Field of Search ........................... 235/61 R, 78 M; 708/490, 523, 603, 578, 520, 521, 524, 631, 670, 505, 233, 406, 508; 712/221; 711/169

(56) References Cited

U.S. PATENT DOCUMENTS

| | | | | | |
|---|---|---|---|---|---|
| 3,689,893 | A | * | 9/1972 | Taddei ..................... | 228/180.5 |
| 4,488,252 | A | * | 12/1984 | Vassar ....................... | 708/505 |
| 4,827,113 | A | * | 5/1989 | Rikuna ....................... | 235/432 |
| 4,862,407 | A | * | 8/1989 | Fette et al. ................... | 712/35 |
| 4,955,024 | A | * | 9/1990 | Pfeiffer et al. ............... | 714/763 |
| 4,985,848 | A | * | 1/1991 | Pfeiffer et al. ............... | 345/505 |
| 5,146,592 | A | * | 9/1992 | Pfeiffer et al. ............... | 345/807 |
| 5,155,852 | A | * | 10/1992 | Murakami et al. .......... | 709/100 |
| 5,260,898 | A | * | 11/1993 | Richardson ................. | 708/490 |
| 5,475,828 | A | * | 12/1995 | Goto .......................... | 711/158 |
| 5,939,693 | A | * | 8/1999 | Roeckner et al. .......... | 235/61 P |
| 5,944,775 | A | * | 8/1999 | Satoshi ....................... | 708/603 |
| 6,052,705 | A | * | 4/2000 | Iwase et al. ................ | 708/521 |
| 6,157,973 | A | * | 12/2000 | Ohtani et al. ............... | 710/100 |
| 6,249,858 | B1 | * | 6/2001 | Hayakawa et al. .......... | 712/34 |
| 6,560,754 | B1 | * | 5/2003 | Hakewill et al. ............ | 716/4 |

OTHER PUBLICATIONS

American Mathematical Society, Mathematics of Computation, vol. 44, No. 170, Apr. 11, 1985, pp. 519–521 Modular Multiplication Without Trial Division, by Peter L. Montgomery.

* cited by examiner

*Primary Examiner*—Karl D. Frech
*Assistant Examiner*—Edwyn Labaze
(74) *Attorney, Agent, or Firm*—Steven Capella (57) ABSTRACT

A circuit and a method for solving the Montgomery multiplier bottleneck problem encountered during a memory access using two ports or single port general-purpose memories is described. A first and a second memory are provided such that variables that are stored in one memory must be read for an operation to be recorded in the second memory. Thereafter, during a reading cycle corresponding to a pipeline process, certain of the variables are read from the first memory and are loaded in the predetermined register while the other variables are read from the second memory and are loaded in the remaining registers.

14 Claims, 8 Drawing Sheets

ARITHMETIC CIRCUIT TO INCREASE THE SPEED OF A MODULAR MULTIPLICATION FOR A PUBLIC KEY SYSTEM FOR ENCRYPTION

BACKGROUND OF THE INVENTION

The present invention relates to an arithmetic circuit, and more particularly to a circuit for increasing the speed for modular multiplication in a public-key cryptosystem.

Public-key cryptography (asymmetrical cryptography) is generally used to maintain the confidentiality and guarantee the digital authenticity of information being transmitted. Public-key cryptography is a system for transmitting information and a cryptographic method for transmitting information using a pair of keys consisting of a public key and a secret key. A sender uses the public key of a recipient to encrypt a text, and when the cipher text is decrypted, a secret key known only to the recipient is used. According to the public-key cryptography, since (a) unlike the common-key cryptography (symmetrical cryptography) there is no need for correspondents to share and employ a single common key and (b) widespread disclosure of a public key involves no appreciable risk, the maintenance of secrecy while communicating with an unlimited number of persons is possible. Further, when public-key cryptography is employed for digital authentication or to prepare a digital signature, the credibility and trustworthiness of a person with whom one is not acquainted can be established. Therefore, it can readily be asserted that public-key cryptography is a requisite technique for a network supported by a communication system, such as the Internet, and for business transactions that are entered into in such a network.

RSA is the most popular public-key cryptography. The safety afforded by RSA is based on a discrete logarithm problem for a very large integer, or on the difficulty encountered in factoring primes. For example, plaintext M is encrypted into ciphertext C by using a public key (e,n) in accordance with the relational equation $C=M^e(\mod n)$, (M is formed as a block that it is smaller than the integer n). To decrypt the ciphertext C, a discrete logarithm problem (while using a, y and p, find x that satisfies $y=a^x(\mod p)$) must be performed, and the amount represented by $O(2^{SQRT (\log n)})$ must be solved (SQRT is a function for providing a square root). When the integer n is a value having a length that is at least equal to or greater than 512 bits, and that preferably is equal to or greater than 1024 bits, code breaking within a practical time is difficult.

However, when a secret key (d,n) is employed that has the following relationship with the public key (e,n), $ed(\mod \text{lcm}(p-1,q-1))=1$, n=pq (wherein p and q are satisfactorily large prime numbers), the plaintext M can be easily obtained by using the relational equation $M=C^d(\mod n)$ (wherein lcm(a,b) provides the least common product of a and b).

By using a binary representation of an exponent, and the modular-squaring operation and the modular-multiplication operation are repeated, so that at most twice the bit length of the exponent is required for the modular-multiplication operation.

However, even the above described modular-exponentiation operation requires more calculations than are required for symmetrical cryptography, such as DES (Data Encryption Standard). Therefore, the preparation and use of as efficient an algorithm as possible is demanded.

The Montgomery multiplication method is a method for increasing the speed of the modular-squaring operation and the modular-multiplication operation in the above modular-exponentiation operation. The Montgomery multiplication method, as described in "Modular Multiplication Without Trial Division", by Peter L. Montgomery, Mathematics of computations, Vol. 44, No. 170 April 1985, pp. 519–522, is a method whereby addition, multiplication and a shift operation are repeated to perform the modular-multiplication operation while requiring fewer calculations than are required by division for which subtraction is repetitively performed. The essential calculation portion $P \equiv XYR^{-1}(\mod n)$ of the Montgomery multiplication is shown below using pseudo code 1.x. It should be noted that in $P \equiv XYR^{-1}(\mod n)$, $R=(2^r)^m$ and $N \equiv -n^{-1}(\mod 2^r)$. Further, it should be noted that a line number is added to the left of each line in the pseudo code (this provision is hereinafter applied).

(1.1) p=0;
(1.2) for (i=0; i<m; i++){
(1.3) t=$(p_0+x_iy_0)$ N(mod $2^r$);
(1.4) P=$(P+x_iY+t \cdot n)/2^r$;
(1.5)}
(1.6) if (P≧n) P=P−n;

As is shown in the pseudo code 1.x, the repetitive calculation of the essential portion is performed as follows. First, X is divided into m blocks $x_i$ (X=$(x_{m-1}, x_{m-2}, \ldots, x_1, x_0)$), and a partial product addition of $(x_iY)$ with Y is repeated m times (line numbers 1.2 to 1.5). At this time, a product "t·n" is added each time to make $p_0$ equal to 0, where $p_0$ is the lowest block of the intermediate results P (line number 1.4). In this case, t is defined in line 1.3. Further, P is shifted to the right r bits, i.e., is multiplied by $2^{-r}$ (line number 1.4). It should be noted that since $2^{-rm}=R^{-1}$ is obtained by performing the r-bit shift operation m times.

Assuming that a 32-bit multiplier is used to perform the Montgomery multiplication of 512 bits, a loop is repeated 512/32=16 times. In the above pseudo code, 32 bits×512 bits, such as $x_i \cdot Y$ or t·n, is shown for simplification; actually, however, Y and n, of 512 bits each, are divided into 32-bit blocks for calculation. That is, in the calculation the partial product, addition of P is a double loop for which m=16. An example process for performing the Montgomery multiplication using a double loop is shown below using pseudo code 2.x.

(2.1) P=0;
(2.2) for (i=0; i<m; i++){
(2.3) t=$p_0+x_iy_0$(mod $2^r$);
(2.4) t=t·N(mod $2^r$);
(2.5) c=0;
(2.6) for(j=0; j<m; j++){
(2.7) tmp=$p_j+x_iy_j+c$;
(2.8) tmp=tmp+t·$n_j$;
(2.9) if (j!=0)$p_{j-1}$=tmp(mod $2^r$);
(2.10) c=tmp/$2^r$;
(2.11)}
(2.12) $P_{m-1}$=c;
(2.13)}
(2.14) if (P≧n) P=P−n;

In this case, X, Y and n are divided into m blocks, i.e.,

X=$(x_{m-1}, x_{m-2}, \ldots x_1, x_0)$
Y=$(y_{m-1}, y_{m-2}, \ldots y_1, y_0)$
n=$(n_{m-1}, n_{m-2}, \ldots n_1, n_0)$ Assuming one multiplier is employed, two product additions are required for the calculation of the intermediate result tmp. Variables $p_j$, $x_i$, $y_j$, t and $n_j$ are r-bit length numbers, and variable c is a carry from a lower block. In the above pseudo code 2.x, in one iteration of the j-loop, the addition of the 2r-bit length numbers $x_i \cdot y_j$ and $t \cdot n_j$ and the addition of the r+1-bit length number $p_j$ and c are performed (line numbers 2.6 to 2.11), so that following the product addition the intermediate result tmp is a 2r+1-bit length number. The lower r bits of tmp are stored as variable $p_j$, and the upper r+1 bits are stored as the variable c (line numbers 2.9 and 2.10).

In contrast, the addition of $x_i \cdot y_j$ and $t \cdot n_j$ can be performed as two separate loops, as is shown in the following example, using pseudo code 3.x.

(3.1) P=0;
(3.2) for (i=0; i<m; i++){
(3.3) c=0;
(3.4) for (j=0; j<m; j++){
(3.5) tmp=$p_j$+$x_i \cdot y_j$+c;
(3.6) $p_j$=tmp(mod $2^r$);
(3.7) c=tmp/$2^r$;
(3.8)};
(3.9) $p_m$=c; c=0;
(3.10) t=$p_0 \cdot$N(mod $2^r$);
(3.11) for (j=0; j<m; j++){
(3.12) tmp=$p_j$+$t \cdot n_j$+c;
(3.13) if (j!=0)$p_{j-1}$=tmp(mod $2^r$);
(3.14) c=tmp/$2^r$;
(3.15)};
(3.16) $p_{m-1}$=$p_m$+c;
(3.17)};
(3.18) if (P≧n) P=P−n;

In the pseudo code 3.x example, the variable $p_j$ has the r-bit length, and the variable tmp has the 2r-bit length.

In either case, for both pseudo code 2.x and 3.x, the result P, obtained following the double loop used for the Montgomery multiplication, is smaller than 2n. However, since there is no guarantee that the result P will be equal to or smaller than n, "P=P−n" is required, as needed (line numbers 2.14 and 3.18).

In the examples for pseudo codes 2.x and 3.x, basically, $p_j$ is a positive value, stored in an r-bit register, that has been divide the result P into m blocks. However, in the pseudo code 2.x example, c in "$p_{m-1}$=c" on line 2.12 is a maximum r+1 bits. At this time, when the number of bits is divisible by r bits, there is a one bit overflow. Thus, a special process must be performed for the most significant bit to decrement it to m or the loop iteration count must be incremented to m+1. In this specification, to simplify the explanation, it is assumed that in both the above two code examples the j-loop iteration count is m. It should be noted that, in the comparison calculation "if (P≧n)" on lines 2.14 and 3.18 of the two examples, a sign bit must be taken into account.

The Montgomery multiplication can be performed in the manner as is shown in the pseudo codes 2.x and 3.x. However, through a detailed, careful study of the calculation cycle, the performance of the calculation is greatly affected by the register allocation of the variables and the memory structure. The discussion results and problems associated with these codes will now be described.

Reference the case wherein the pseudo code 2.x is used, the variable N, having an r-bit length, is repetitively employed in the i-loop (pseudo code 2.2 to 2.13) without its value being changed, and variables t and $x_i$ are repetitively used in the j-loop (pseudo code 2.6 to 2.11) without their values being changed. Therefore, once the variables N, t and $x_i$ have been calculated or read from memory, they can be stored in the registers and repetitively employed until the loops are exited. The variables tmp and c that are used in the j-loop are directly allocated to the registers, and the other variables are stored in a general two-port memory wherein reading and writing to independent addresses can be performed. Further, it is assumed that the memory reading process sequence and the calculation and the memory writing are performed along a pipeline. However, in this case, since the calculation and the memory writing are terminated after only one cycle, memory reading constitutes a bottleneck during the performance. For this reason, the number of cycles devoted to memory reading will now be considered.

First, for the process P=0 on line 2.1, this value need only be reset when the variable $p_j$ is read the first time for the calculation performed on line 2.7, i.e., tmp=$p_j$+$x_i \cdot y_j$+c. Therefore, no operation cycle is required.

For the calculations for variable t on lines 2.3 and 2.4, i.e., t=$p_0$+$x_i y_0$(mod $2^r$) and t=$t \cdot$N(mod $2^r$), three cycles are required to read variables $p_0$, $x_i$ and $y_0$, other than the variable N that is allocated to the register. It should be noted that the variable t need not be read because, as is described above, the result obtained on line 2.3 is directly allocated for the register. For "c=0" on line 2.5, no operation cycle is required, as it also is for the process for P=0.

When the process sequence enters the j-loop, for the calculation tmp=$p_j$+$x_i \cdot y_j$+c performed on line 2.7 two cycles are required to read variables $p_j$ and $y_j$. The variable $x_i$ need not be read here since it is read at the time the variable t is calculated on line 2.3. Further, the variable c also need not be read because it is directly allocated to a register, as was previously remarked.

For the calculation performed for line 2.8, i.e., tmp=tmp+$t \cdot n_j$, one cycle is required to read the variable $n_j$, but the variables tmp and t need not be read since, as is described above, they are directly allocated to registers.

In the actual hardware operation for the calculations on line 2.9, i.e., $$P_{j-1}=tmp(\mod 2^r)$$

$$c=tmp/2^r,$$

"tmp+$t \cdot n_j$" must be written directly to the variables $p_{j-1}$ and c, rather than being temporarily allocated to the register tmp. Thus, both calculations require no operation cycle.

For the calculation $p_{m-1}$=c performed on line 2.12, immediately after the process has exited the j-loop, no operation cycle is required by the pipeline process.

Therefore, the number of operation cycles in the i-loop is 3+m(2+1)=3m+3. Then, this is multiplied by m of the i-loop, and m(3m+3)=3m²+3m.

However, since $p_j$=0, because, as is described above, i=0, $p_j$ need not be read, and the input need only be reset to 0. Overall, therefore, for the i-loop, m is subtracted from the above result and $$3m^2+3m-m=3m^2+2m$$

is obtained. In the comparison process in line 2.14, "if (P≧n), which value is greater or smaller is determined by the subtraction operation "P−n", so that 2m cycles are required, and two cycles are required before the process finally exits the pipeline. Overall, therefore, the required number of cycles is 3m²+4m+2. This is a case wherein the pipeline operation can be performed without being disturbed. When the number of operation bits is not very much greater than the number used by multipliers, i.e., when the block count m is small, a value to be written must be read immediately, so that for the memory access a waiting overhead is added. It should be noted that this problem does not occur when the block count is from four to five. Further, since the use of the Montgomery method is not very effective for a small number of blocks, such as two or three, the above problem need not be taken into account. In other words, the coefficient "3" of the term $m^2$ is not greatly changed due to the double loop. Further, the pipeline process may be disturbed before or after the j-loop, and the finally obtained number of cycles may differ. However, even in this case, in the double loop, the coefficient "3" of term $m^2$ is unchanged, and the final cycle number does not greatly differ from the above described value.

The pseudo code 3.x example will now be similarly discussed as follows. For the process for "P=0" in line 3.1, the value of P need only be reset to 0 when $p_j$ is read the first time for the calculation $tmp=p_j+x_i \cdot y_j+c$ performed on line 3.5, so that no operation cycle is required. For the process for "c=0" on line 3.1, no operation cycle is required, as it also was in the pseudo code 2.x example.

When the process enters the first j-loop (line numbers 3.4 to 3.8), for the calculation performed on line 3.5, i.e., $tmp=p_j+x_i \cdot y_j+c$, two cycles are required to read $p_j$ and $y_j$, and $x_i$ must be read the first j-loop. For the calculation performed on line 3.6, i.e., $p_j = tmp(\mod 2^r)$ $c = tmp/2^r,$ no cycle is required since tmp is written directly to $p_j$ and c, as in the pseudo code 2.x example. Therefore, the cycle count for the first j-loop is 2m+1.

After the process exits the first j-loop, because of the pipeline process the calculation performed on line 3.9, "$p_m = c$; $c=0$;", requires no cycle, while for the calculation performed on line 3.10, $t = p_0 \cdot N (\mod 2^r)$, two cycles are required to read $p_0$ and N.

Following this, the process enters the second j-loop (line numbers 3.11 to 3.15), and for the calculation performed on line 3.12, $tmp=p_j+t \cdot n_j+c$, two cycles are required to read $p_j$ and $n_j$. It should be noted that t and c need not be read because they are written directly to registers. In the following calculation performed on line 3.13, $p_{j-1} = tmp(\mod 2^r)$ $c = tmp/2^r,$ no cycle is required, as in the pseudo code 2.x example. Therefore, the number of cycles required for the second j-loop is 2m. Then, after the process exits the second j-loop, for the calculation performed on line 3.16, i.e., $p_{m-1} = p_m+c$, one cycle is required to read $p_m$.

Figure 7:
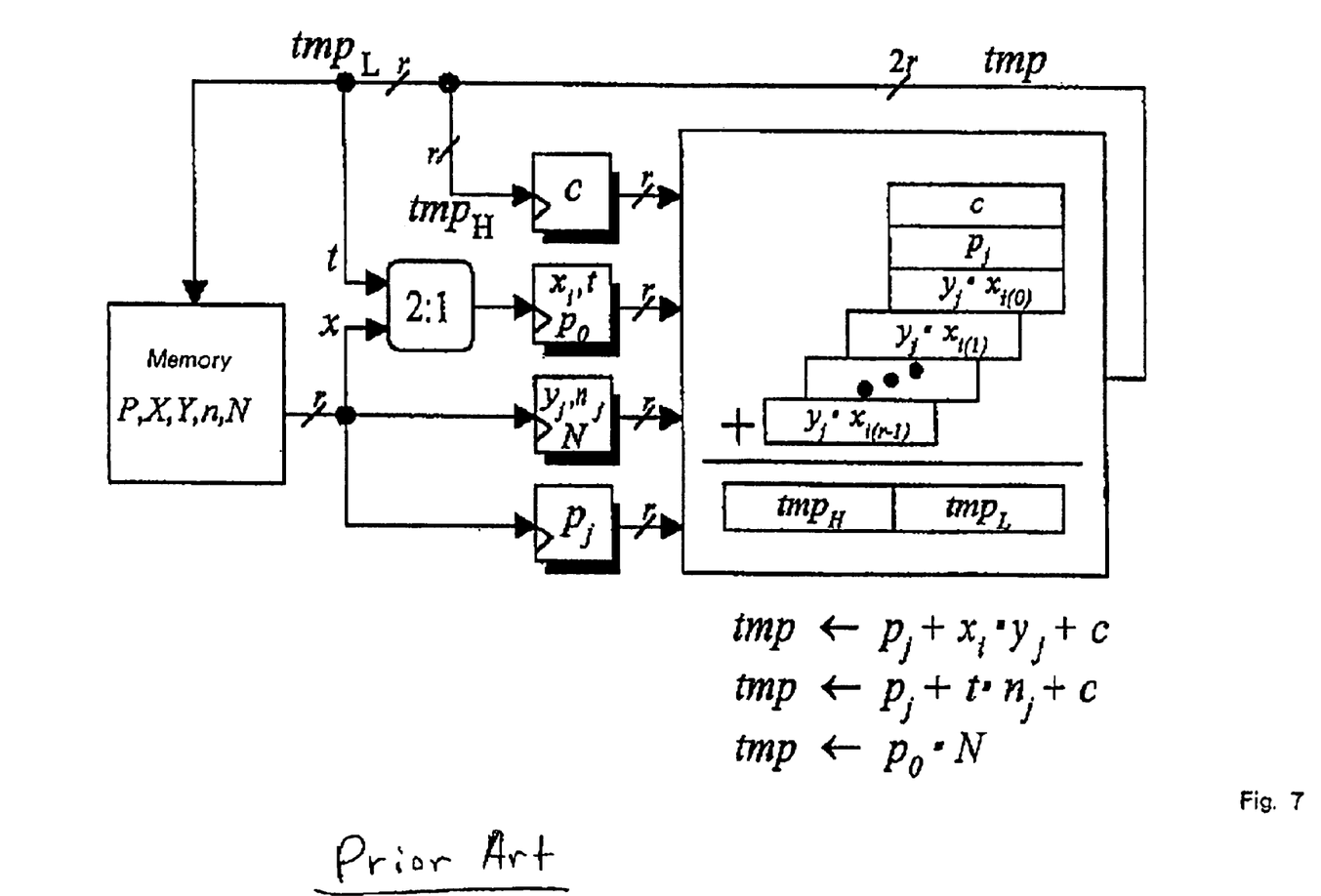
FIG. 7 is a circuit block diagram showing a data path section for a conventional Montgomery multiplier for pseudo code 3.x.
Figure 8:
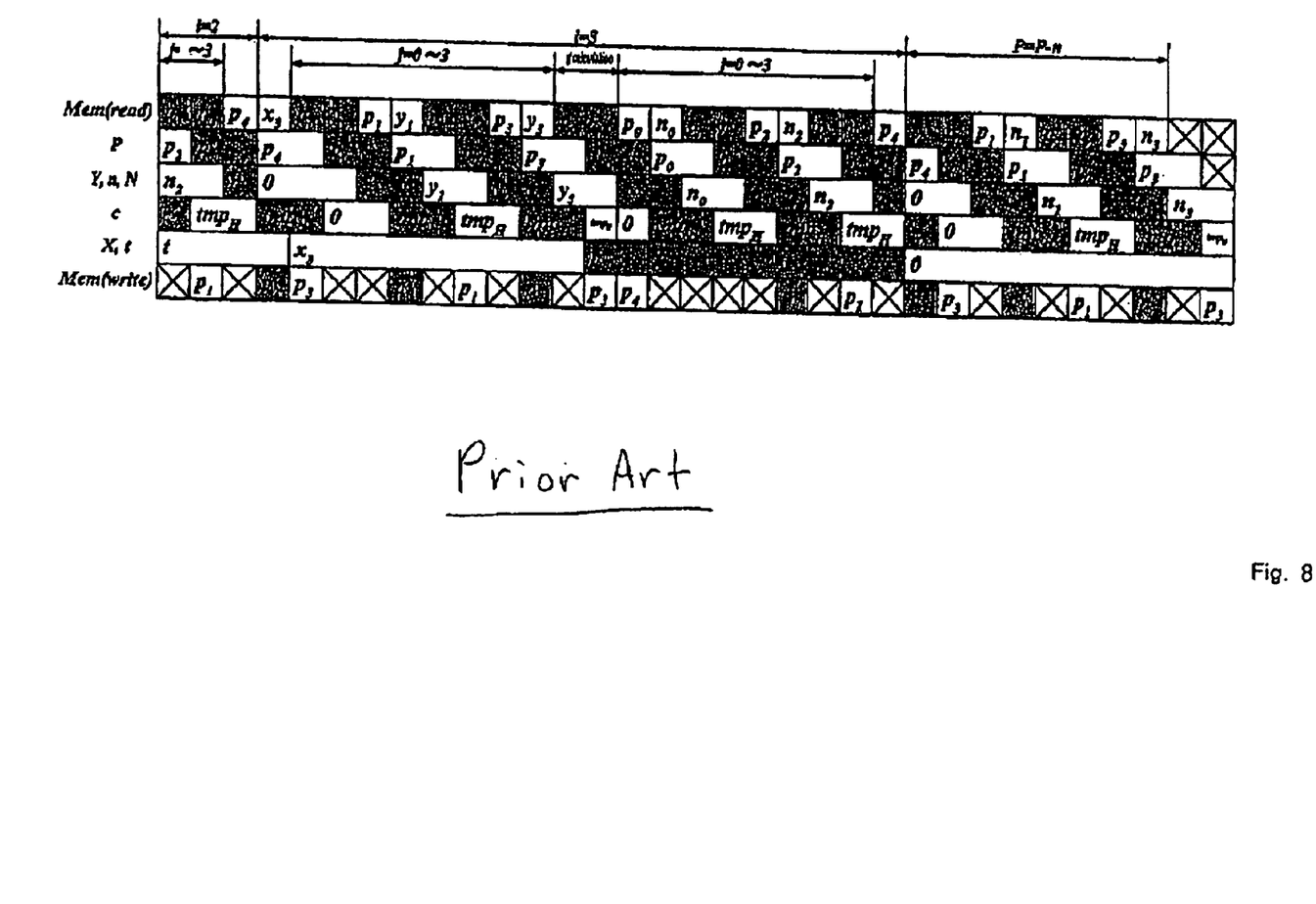
FIG. 8 is a timing chart showing the timing for the vicinity of the final loop in FIG. 7 when block count m=4.

Therefore, the number of operation cycles required for the i-loop is $(2m+1)+2+2m+1=4m+4$. This cycle count is multiplied by m in the i-loop, and $m(4m+4)=4m^2+4m$ is obtained. However, as is described above, $p_j$ need not be read when i=0, and since the input must then merely be reset to 0, overall, the number of cycles required for the i-loop is decremented by m, and is $4m^2+4m-m=4m^2+3m$. In the comparison process performed on line 3.18, i.e., if $(P \geq n)$, 2m cycles are required to use the substraction operation "P−n" to determine which value is greater or smaller, and two cycles are required to exit the pipeline process. As a result, overall, the required number of cycles is $4m^2+5m+2$. The number of cycles required by the pseudo code 3.x example is greater by $m^2$ because, since the partial product addition to the tmp is not performed during a single iteration of the j-loop, the variable $p_j$ that from line 3.4 to line 3.8 is written to memory is read from line 3.11 to line 3.15. The pseudo code 3.x example is more advantageous than is the pseudo code 2.x example because, even though many cycles are required, the carry is smaller than that of the pseudo code 2.x by one bit, and can be stored into the r-bit block, and less number of registers are required. Therefore, the pseudo code 3.x example is more advantageous with respect to complexity of control and the circuit size. FIG. 7 is a circuit diagram showing a Montgomery multiplier data path unit for the pseudo code 3.x, and FIG. 8 is a timing chart for the vicinity of the final loop iteration performed by this multiplier when the block count m=4. It should be noted that, as in the pseudo code 2.x example, overall, the number of reading cycles can be slightly changed due to the number of the pipeline stages.

Consider the increase in the speed of the Montgomery multiplication relative to the memory reading timing. Since multiplication is performed twice in the double loop, it seems that the processing speed can be doubled simply by implementing two multipliers. However, as is described above, the memory reading constitutes a bottleneck. In order to eliminate this bottleneck, a three-port memory having two read ports for independent reading and one write port can be employed. The operation speed can be increased by using a three-port memory, however technology libraries that support the memory are limited. Therefore use of three-port memory may become a barrier to register the Montgomery multiplier as an IP core macro. Further, a three-port memory requires a large circuit size, and does not respond to a size reduction demand.

It is, therefor, one object of the present invention to resolve the problem posed by a memory access bottleneck in a Montgomery multiplier, while using a general-purpose memory having two ports or only a single port. Thus, higher performance and element downsizing can be attained, and a lower cost cryptography circuit can be provided.

SUMMARY OF THE INVENTION

The specific effects obtained by the invention are as follows. The bottleneck encountered with the Montgomery multiplier when memory is accessed can be eliminated by using general two-port memories or single-port memories. And as a result, high-level performances can be attained while circuit sizes are reduced, and a low-cost cryptographic hardware can be provided.

According to an arithmetic circuit and an arithmetic method, variables that are required for an arithmetic operation performed during a single cycle and that must be read from memory can be stored in a different memory, and may be read at the same time during a single reading stage. In this manner, reading wait time can be minimized, and the performance of calculations can be improved. Furthermore, a complicated circuit or a circuit that requires a large hardware resource, such as a three-port memory, need not be employed as the memory used for storing variables, and instead, by employing a general-purpose memory having two ports or only a single port, an IP core can be easily formed, and the circuit size can be minimized.

According to the present invention, an arithmetic circuit comprises: multiple registers; an arithmetic unit, for regarding, as inputs, values entered in the multiple registers; and multiple memories, wherein the reading of multiple variables from the multiple memories to the multiple registers is performed during the same reading stage using a pipeline process performed by the arithmetic unit. Furthermore, according to the present invention, an arithmetic method using an arithmetic circuit that includes an arithmetic unit, which has multiple input registers and multiple memories, comprises the steps of: performing an arithmetic operation based on values stored in the input registers; writing the results of the arithmetic operation in the input registers or the memories; and reading multiple variables from the multiple memories and storing the variables in the multiple input registers during the same pipeline stage.

The arithmetic unit can be a multiplier adder for, based on values $x_1$, $x_2$, $x_3$ and $x_4$ having an r-bit length that are respectively input to a first register, a second register, a third register and a fourth register, providing the operation results Q for $x_1+x_2 \cdot x_3+x_4$ having a length of 2r bits or 2r+1 bits. In this case, the multiple memories include a first memory and a second memory. At a stage for writing an operation result, which follows the operation stage of the pipeline process, lower r bits QL of the operation result Q are recorded in the first memory, and upper bits QH of the operation result Q, excluding the bits QL, are recorded in the fourth register, while at a stage for reading variables from the registers, which follows the writing stage, simultaneously, a variable $x_1$ is read from the first memory and is stored in the first register, and a variable $x_3$ is read from the second memory and is stored in the third register. Further, the first memory and the second memory can be two-port memories having one data writing port and one data reading port, or the first memory can be a two-port memory having one data writing port and one data reading port, while the second memory can be a single-port memory having one port for the writing and reading of data.

In addition, the arithmetic unit can be a multiplier adder for, based on values $x_1$, $x_2$, $x_3$, $x_4$ $x_5$ and $x_6$, having an r-bit length, that are respectively input to a first register, a second register, a third register, a fourth register, a fifth register and a sixth register, and for providing the operation results Q for $x_1+x_2 \cdot x_3+x_4 \cdot x_5+x_6$, which have a length of 2r bits or 2r+1 bits. In this case, the multiple memories include a first memory, a second memory and a third memory. At a stage for writing an operation result, which follows the operation stage of the pipeline process, lower r bits $Q_L$ of the operation result Q are recorded in the first memory, and upper bits $Q_H$ of the operation result Q, excluding the bits $Q_L$, are recorded in the sixth register, and at a stage for reading variables to the registers, which follows the writing stage, simultaneously, a variable $x_1$ is read from the first memory and is stored in the first register, a variable $x_3$ is read from the second memory and is stored in the third register, and a variable $x_5$ is read from the third memory and is stored in the fifth register. Further, the first memory can be a two-port memory having one data writing port and one data reading port, and the second memory and the third memories can be single-port memories having one port for the writing and reading of data.

DETAILED DESCRIPTION OF THE INVENTION

The preferred embodiments of the present invention will now be described in detail while referring to the accompanying drawings. It should be noted, however, that the present invention can be implemented by a variety of different embodiments, and is not limited to the embodiments described herein. The same reference numerals are used throughout the embodiments to denote corresponding or identical components.

Figure 1:
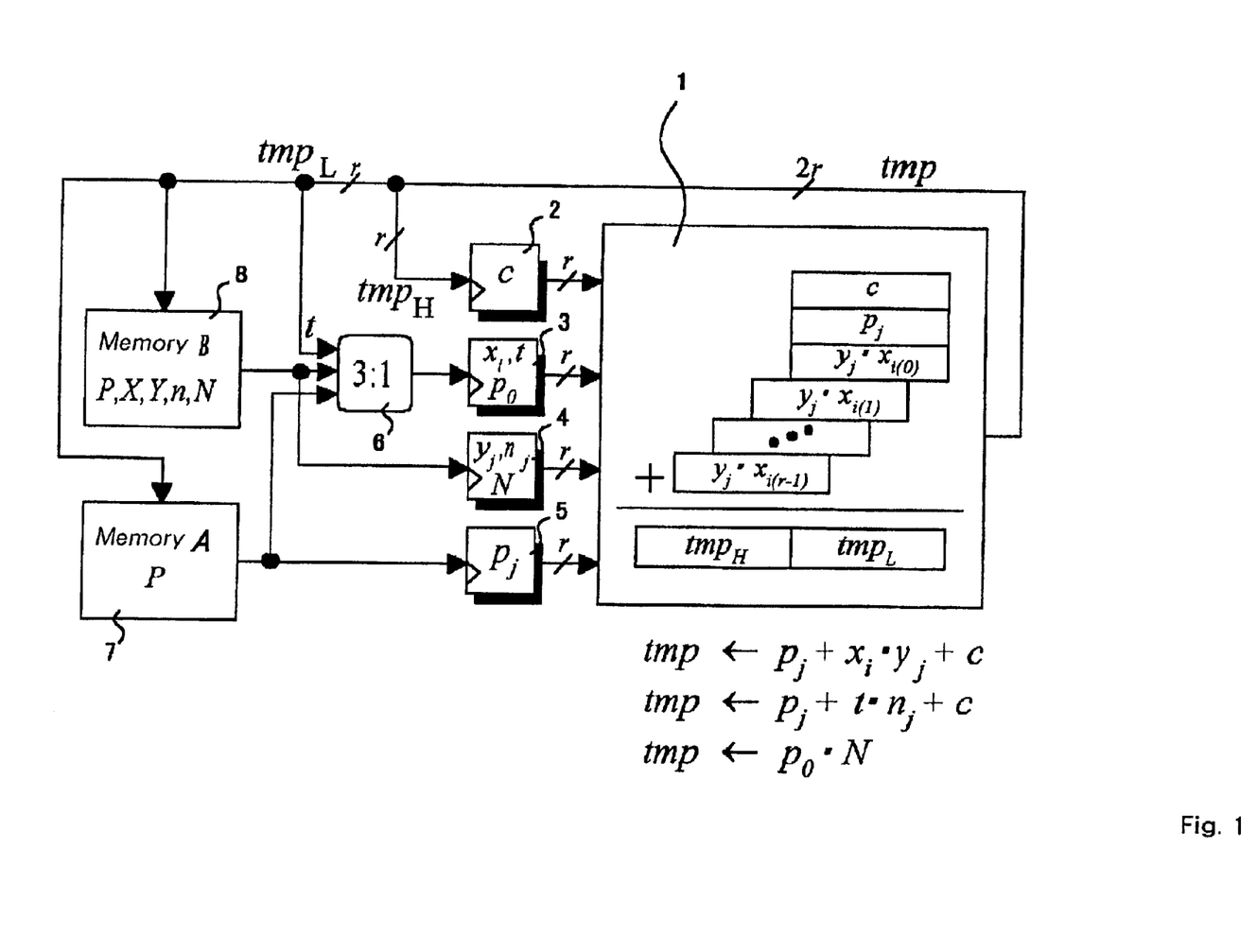
FIG. 1 is a block diagram showing a data path section for an example Montgomery multiplier according to a first embodiment of the invention.

In a first embodiment of the invention, FIG. 1 is a block diagram showing a data path section for an example Montgomery multiplier according to a first embodiment of the invention. The Montgomery multiplier in this embodiment comprises: a multiplier adder 1, input registers 2 to 5, a multiplexer 6, and two memories 7 and 8 (memory A and memory B).

The multiplier adder 1 adds the input values (r-bit lengths) of the registers 2 and 5 to the product of the input values (r-bit lengths) of the registers 3 and 4, and obtains the output tmp having a 2r-bit length. That is, the output tmp=$p_j$+$y_j \cdot x_i$+c is obtained from the addition input $p_j$ and c and the multiplication input $y_j$ and $x_i$. The multiplier adder 1 can be constituted by, for example, a well known full adder FA and half adder HA. In FIG. 1, a value, such as $x_{i(0)}$, denotes a value obtained by extracting a bit that corresponds to the number in the parenthesis for a variable $x_i$.

Data are read from the memories 7 and 8 and input to the input registers 2 to 5, or the output from the multiplier adder 1 is directly input to these registers. The multiplexer 6 is a switch for receiving three inputs and providing one output.

The memories 7 and 8 are general, two-port memories, i.e., memories for which data writing or data reading is performed by using one of two independent ports. An intermediate variable P($p_j$) in the double loop process is recorded in the memory 7 (memory A), and other variables X($x_i$), Y($y_j$), n($n_j$) and N and the final results P($p_j$) are recorded in the memory 8 (memory B). The memories 7 and 8 are two-port memories, and do not constitute a barrier for the IP core formation, and do not increase the circuit area.

In the arithmetic operation performed in this embodiment, the reading, computation and writing of data are performed as a pipeline operation. That is, the stage for reading data from the memories to the registers, the stage for the arithmetic operation based on the value input to the registers, and the stage for writing the operating results in the registers or the memories are performed in parallel.

Figure 2:
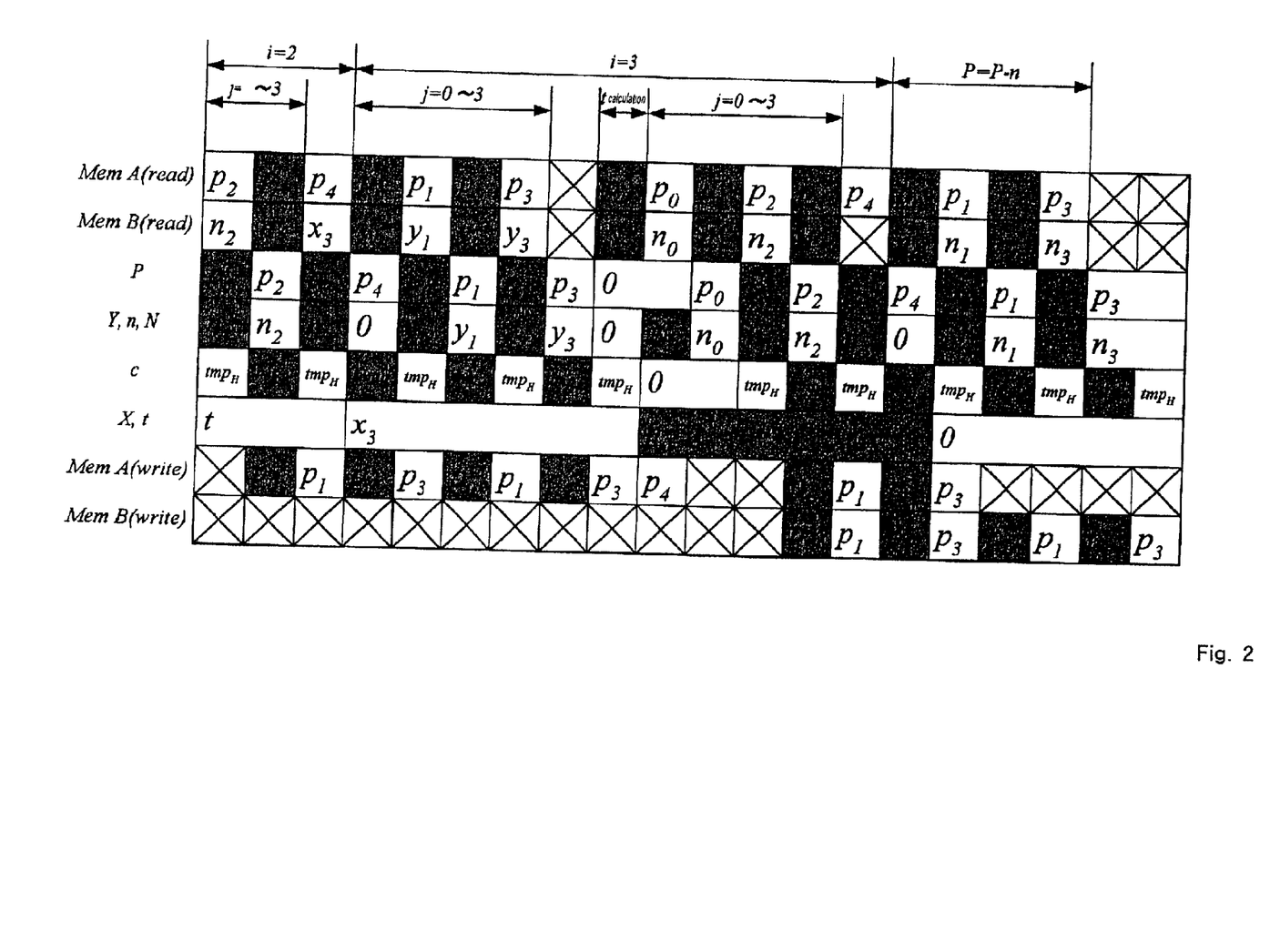
FIG. 2 is a timing chart showing the timing for the process performed by the circuit in FIG. 1 for pseudo code 3.x.

FIG. 2 is a timing chart showing the timing for the process performed by the circuit in FIG. 1 for the pseudo code 3.x example. In FIG. 2, the vicinity of the final loop when m=4 is shown. In this and the following timing charts, the pipeline process (the reading and computing of data and the writing of the results) is shown using gray or white to be represented with the same background color. On the left end of the chart, reading target memories (MemA(read), MemB (read)), registers ($p_j$ (register 5), $y_j$, $n_j$ and N (register 4), c (register 2), and $x_i$ and t (register 3)), and writing target memories (MemA(write), MemB(write)) are used as indexes. In each line of the chart, data read from each memory at the reading stage, data loaded in each register at the operation stage, and data to be written at a writing stage are shown.

In the processing performed the first j-loop of the pseudo code 3.x example (line numbers 3.4 to 3.8), e.g., the process for the first j=0 to 3 in the i-loop=3 in FIG. 2, first, in the loop for j=0, $p_0$ is read from the memory 7 (MemA) and input to the register 5($p_j$), and $y_0$ is read from the memory 8 (MemB) and input to the register 4 ($y_j$, $n_j$, N) (reading stage). Simultaneously with the reading stage, the operation stage (calculation process on line 3.16) of the preceding cycle and the writing stage of its antecedent (the writing of P2 to the memory 7 (MemA) and the writing of upper bits $tmp_H$ to the register c) are performed.

Then, at the reading stage for j=1, $p_1$ is read from the memory 7 (MemA) and is loaded in the register 5 ($p_j$), and $y_1$ is read from the memory 8 (MemB) and is loaded in the register 4 ($y_j$, $n_j$, N). At the same time, the operation on line 3.5 is performed based on $p_0$ and $y_0$, which was read previously, the operation result ($tmp_H$), which was obtained at the preceding step and loaded in the register 2 (c), and $x_3$, which was loaded in register 3 ($x_i$, t) (operation stage). At this time, the writing stage of the preceding cycle is performed (the writing in memory 7 (MemA) of $p_3$, and the writing in register c (register 2) of upper bits $tmp_H$).

Following this, at the reading stage for j=2, $p_2$ is read from the memory 7 (MemA) and loaded in the register 5 ($p_j$), and $y_2$ is read from the memory 8 (MemB) and is loaded in the register 4 ($y_j$, $n_j$, N). At the same time, an operation is performed based on the data read and loaded in the registers at the preceding cycle, and the upper bits $tmp_H$ and lower bits $p_0$ of the previously obtained operation result (the result based on the variables $p_0$, $x_3$, $y_0$ and c) are loaded in the register c and written in the memory 7 (MemA) (writing stage). In this manner, the pipeline process, from the input of $p_0$ and $y_0$ to the recording of results, is performed. The same process is performed for the other variables $p_j$ and $y_j$.

In the process performed on line 3.9, one blank cycle is inserted between reading cycles, and after the operation stage for j=3, the data in the register c are written to the memory 7 as $p_4$.

Next, in the process performed on line 3.10 (calculation of t), during the same reading stage, $p_0$ is read from the memory 7 and is written in the register 3, and N is read from the memory 8 and is written to the register 4. At the next writing stage, the operation result is written as a variable t in the register 4.

In the processing performed on lines 3.11 to 3.15 the second j-loop, as well as in the first j-loop, at the same reading stage, $p_j$ and $n_j$ are respectively read from the memories 7 and 8, and the operation on line 3.12 is performed using the variables t and c that were input previously. Thereafter, the lower bits of the operation result are recorded as $p_{j-1}$ in the memory 7 (line number 3.13), while the upper bits are loaded in the register c (line number 3.14). It should be noted that c is reset to 0 in the process for j=0 during the second j-loop, and the lower bits of the operation result are not recorded when j=0.

In the process performed on line 3.16, $p_4$ is read from the memory 7 and is loaded in the register 5 ($p_j$), and this data is added to the data in the register c. The result is stored into the memory 7 as $p_3$. It should be noted that in the memory writing process in the final i-loop, $p_j$ is stored not only in the memory 7 but also in the memory 8.

Finally, in the process performed line 3.18, $p_j$ and $n_j$ are read from the memory 7 and loaded in the individual registers, and a comparison is performed. That is, the result obtained by subtraction in "P=P−n" is stored at a location in the memory 8 (MemB) whereat the previous result P is not overwritten. In the memory 8 (MemB), P obtained when the process exits the final j-loop and P−n obtained by subtracting n from P are stored, and when P−n is positive, P−n is employed as the final result, while when P−n is negative, P is employed as the final result. After the process has exited the final j-loop, P is also written in the memory 7 (MemA) simply because, for the calculation performed for P−n, P is read at the same time as n is read from the memory 8 (MemB).

Thereafter, the operation for the pseudo code 3.x example is terminated. In the above processing, at the same reading stage the variables are read from the memories. This process is enabled because two memories are provided and variables that may be read at the same time are stored in the separate memories. Therefore, the time spent while waiting for the memory reading can be shortened, compared with the conventional method, and the process performance can be improved.

The number of cycles during the reading stage in the above processing can be explained as follows. m cycles are required for the first j-loop, 2 cycles are required for the process performed on lines 3.9 and 3.10, m cycles are required for the second j-loop, and one cycle is required for the process performed on line 3.16, so that the total of 2m+3 cycles are required for the processing in the i-loop. This is multiplied by m for the i-loop, so that $2m^2+3m$ cycles is obtained. Since $y_j$ must be read during the cycle wherein i=0, while $p_j$ need not be read, the subtraction of m is not required. Further, m cycles are required for the comparison on line 3.18, and two cycles are required to exit the pipeline process. Therefore, the required number of cycles that is finally obtained is $2m^2+4m+2$. While for the conventional method $4m^2+5m+2$ reading cycles are required, about half that number of cycles is required for this invention.

The pseudo code 3.x example has been employed for the explanation of this embodiment; however, as is shown in the pseudo code 2.x example, $x_i \cdot y_j$ and $t \cdot n_j$ can be added together during a single j-loop. Compared with the pseudo code 3.x, for the pseudo code 2.x the number of cycles spent waiting for the reading of the variable $p_j$ is reduced by about half, so that overall, the number of cycles is smaller. However, when the two memories are provided and are separately employed as in this embodiment, there is no difference in the effects obtained by the two pseudo codes. This is because, as is apparent from FIG. 2, $p_j$ and $y_j$, or $p_j$ and $n_j$ can be read from the different memories at the same time, and there is no extra waiting time. In this embodiment, even for the pseudo code 2.x, the required number of cycles can be reduced to about ⅔ the conventional number, $3m^2+4m+2$. Further, since the bit length is not increased to r+1 bits by inducing an extra carry to $P_{m-1}$, an exception process is not required and the circuit structure can be simplified.

Figure 3:
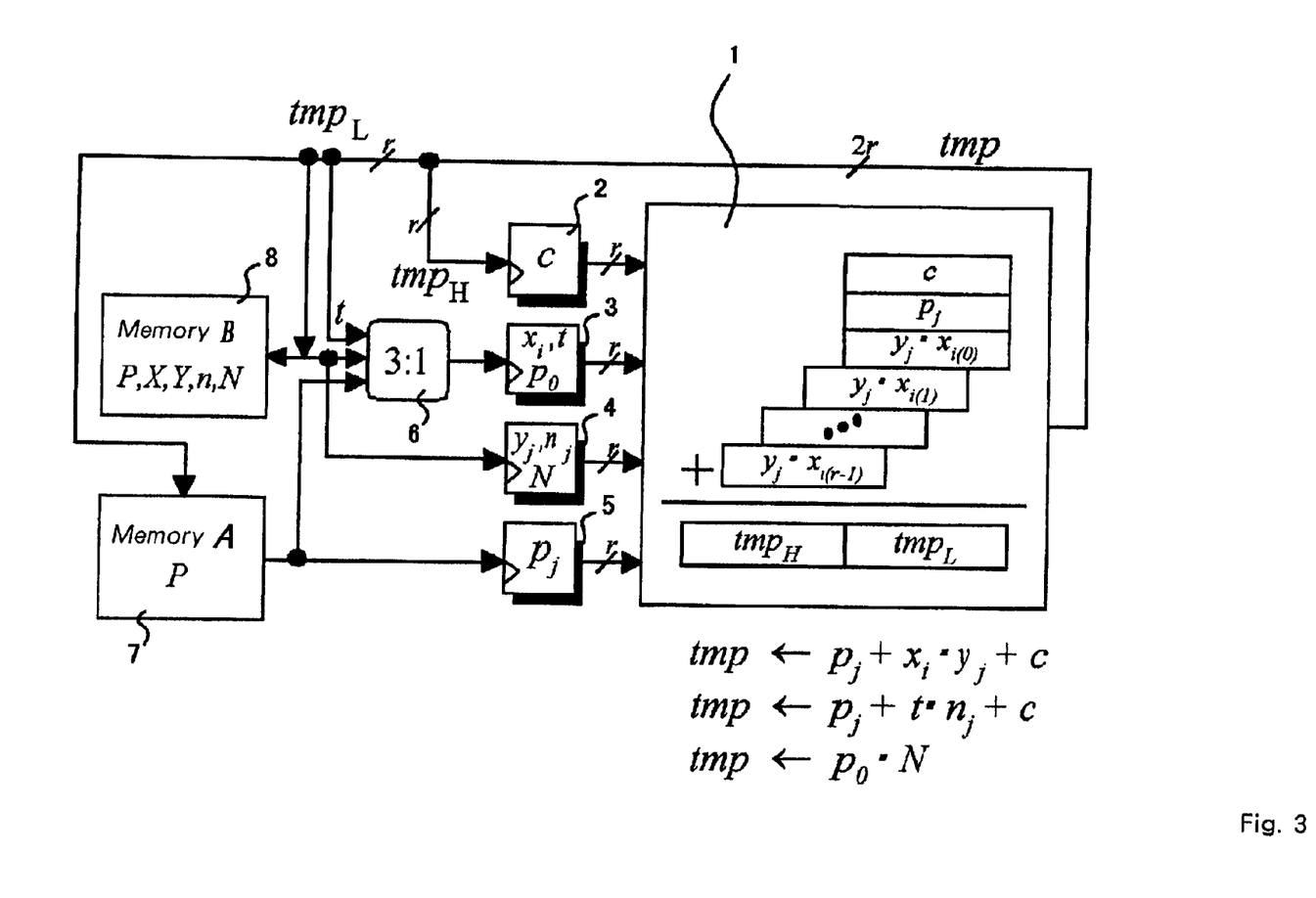
FIG. 3 is a block diagram showing a data path section for an example Montgomery multiplier according to a second embodiment of the invention.

FIG. 3 is a block diagram showing a data path section for an example Montgomery multiplier according to a second embodiment of the invention. The arithmetic circuit in this embodiment is the same as in the first embodiment, except that a memory 8 (memory B) is a single-port memory, i.e., employs the same port both for data reading and data writing. In this embodiment, since a single-port memory is employed as the memory 8, the memory size can be reduced, and accordingly, smaller circuit can be obtained.

Figure 4:
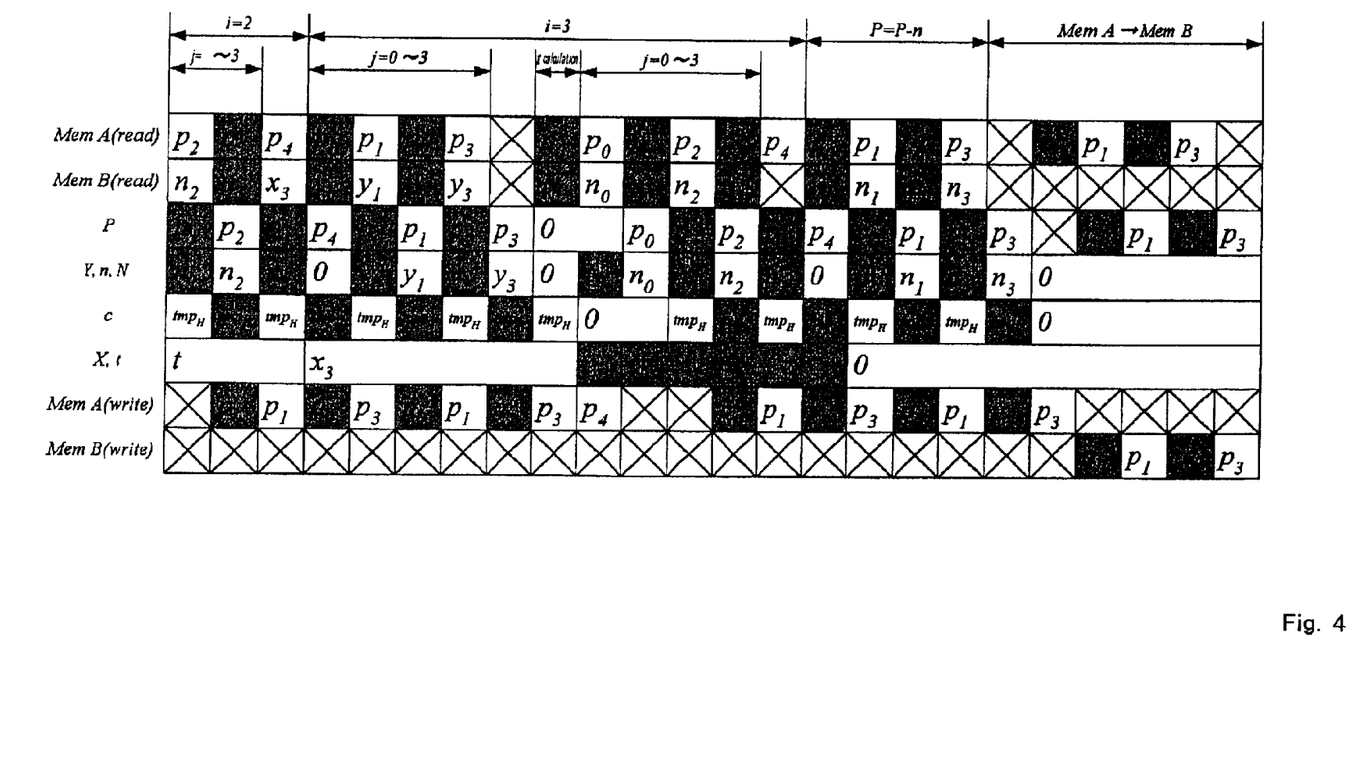
FIG. 4 is a timing chart showing the timing for the process performed by the circuit in FIG. 3 for pseudo code 3.x.

FIG. 4 is a timing chart showing the timing of a process performed by the circuit in FIG. 3 for the pseudo code 3.x example. In FIG. 4, the vicinity of the final loop when m=4 is shown. As is shown in FIG. 4, the process up until the i-loop is terminated is the same as the first embodiment. In the processing performed for P=P−n, since a single-port memory is employed as the memory 8 in this embodiment, the final calculation result, $p_j$, is written in the memory 7 (MemA) instead of the memory 8. Then, finally, $p_j$ is transmitted from the memory 7 (MemA) to the memory 8 (MemB). That is, during the correction of the final result P, P−n is determined to be the final result when P≧n; however, whether or not P≧n is established can not be determined until the subtraction has been performed. Therefore, in the first embodiment, both P and P−n are written to the memory 8 (MemB), and one of them is selected in accordance with the results of the subtraction, while in this embodiment, P and P−n are written only to the memory 7 (MemA), and one of them is written to the memory 8 (MemB) in accordance with the results of the subtraction. As a result, with the only penalty being that the number of cycles is incremented to m+1, a single-port memory can be employed as the memory 8 (MemB), and the memory size can be reduced. The number of cycles required for this embodiment is $2m^2+5m+3$, whereas when the pseudo code 2.x is conventionally processed using the single-port memory, the number of cycles is $4m^2+5m+2$, and when the pseudo code 3.x is processed, the number of cycles required is $6m^2+7m+2$. Thus, the demonstrated superiority of the invention is even more outstanding.

Figure 5:
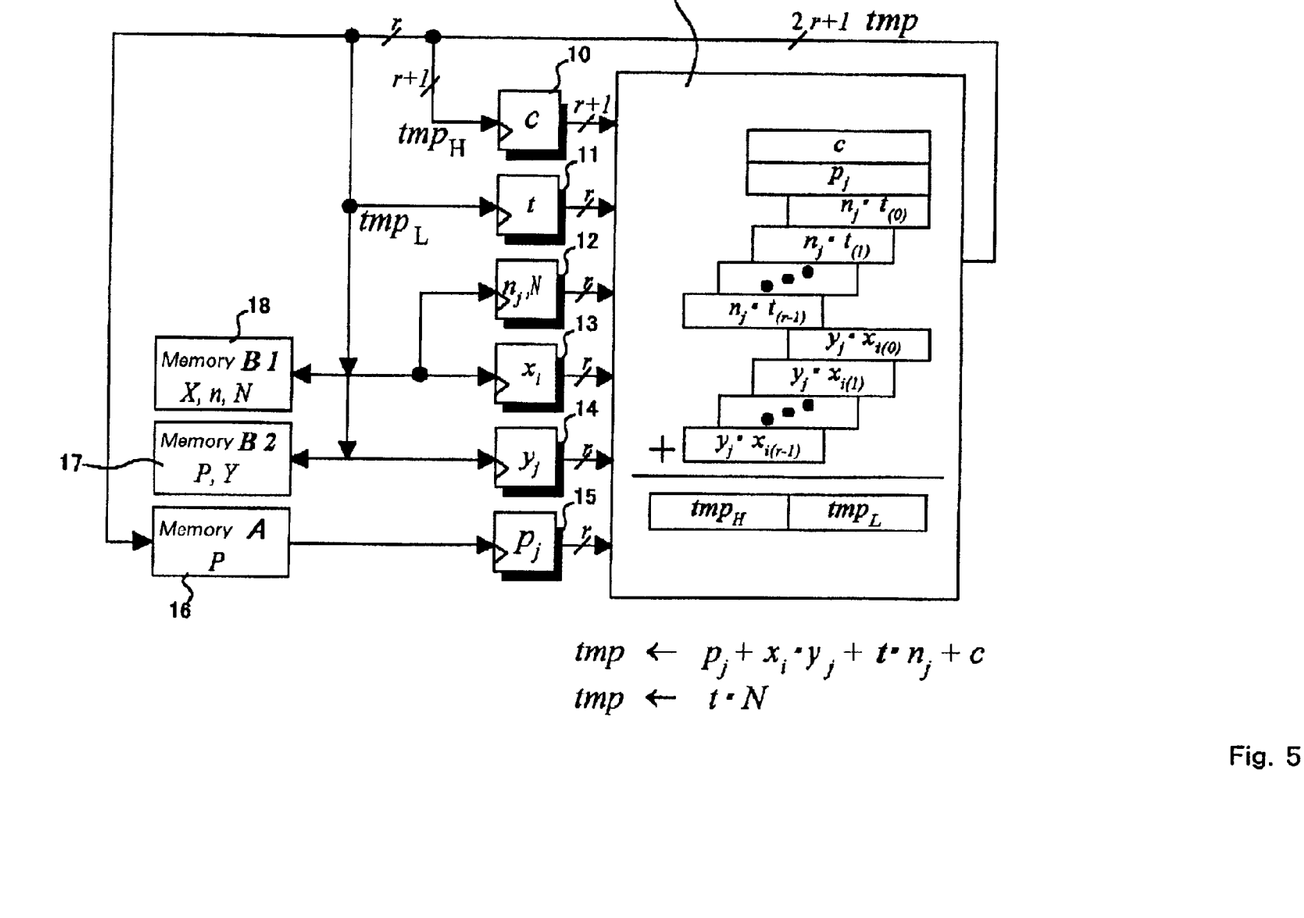
FIG. 5 is a block diagram showing a data path section for an example Montgomery multiplier according to a third embodiment of the invention.

FIG. 5 is a block diagram showing a data path section for an example Montgomery multiplier according to a third embodiment of the invention. The Montgomery multiplier of this embodiment includes a multiplier adder 9, input registers 10 to 15 and three memories 16, 17 and 18 (memory A, memory B1 and memory B2).

The multiplier adder 9 adds the product of input values (r-bit lengths of the register 11 (t register) and the register 12 ($n_j$, N register), the product of the input values (r-bit lengths) of the register 13 ($x_i$ register) and the register 14 ($y_j$ register), and the input value (r+1 bit length) of the register 10 (c register), and the input value (r-bit length) of the register 15 ($p_j$ register), and provides as output tmp, which has a 2r+1 bit length. That is, the multiplier adder 9 has two multipliers, and obtains the output tmp=$p_j+y_j\cdot x_i+t\cdot n_j+c$ from the addition input for $p_j$, c, the product input for $y_j$, x, and the product input for t, $n_j$.

The registers are the same as those in the first embodiment. The memory 16 (MemA) is a general two-port memory, and the memories 17 and 18 (MemB1 and B2) are single-port memories. Since these general memories are employed, the barrier to IP core formation is encountered, and the increase in the number of memories can be compensated for by a reduction of the circuit area occasioned by the employment of the single-port memories.

Figure 6:
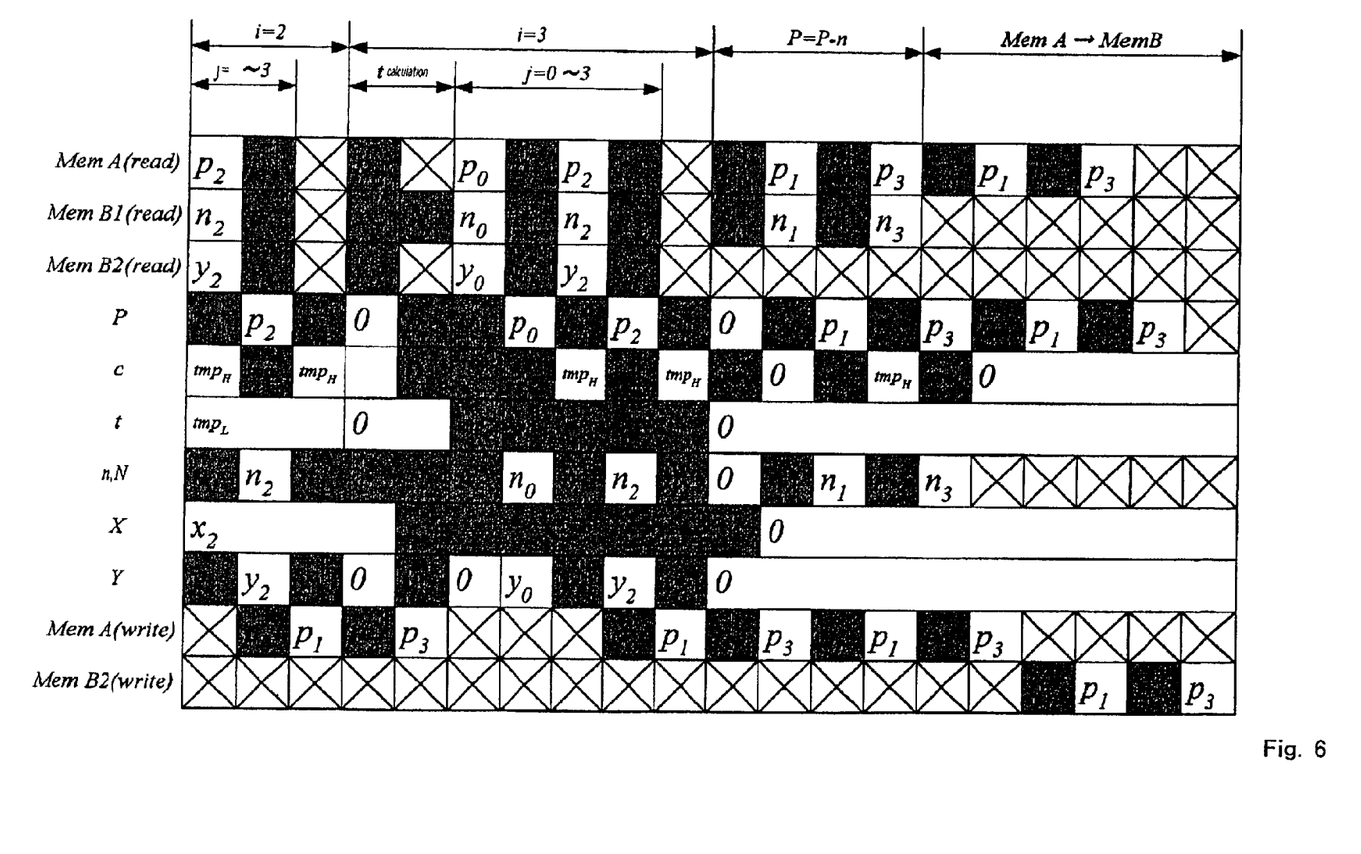
FIG. 6 is a timing chart showing the timing for the process performed by the circuit in FIG. 5 for pseudo code 2.x.

FIG. 6 is a timing chart showing the timing for the process performed by the circuit in FIG. 5 for the pseudo code 2.x example. In FIG. 5, the vicinity of the final loop when m=4 is shown.

First, the calculation of t (pseudo codes 2.3 and 2.4) is performed the first i-loop. $P_0$ is read from the memory 16, $x_3$ is read from the memory 17 and $y_0$ is read from the memory 18. These data reading processes are performed during one reading stage. The operation on line 2.3 is performed using the variables that are read, and the lower bits $tmp_L$ of the calculation result are loaded in the t register. In parallel with the calculation, N is read from the memory 17, and the calculation on line 2.4 is performed using t and N. The lower bits $tmp_L$ of the operation result are loaded in the t register, and the value of t is employed throughout this loop. In this case, $x_3$, which was read previously, is also employed throughout the loop.

Next, when the process enters the j-loop, $p_0$, $n_0$ and $y_0$ are read from the memories 16, 17 and 18, and during the same cycle are loaded in the pi register, the $n_j$, N register and $y_j$ register. Thereafter, the operation is performed that uses the data for c, t and $x_3$, and the lower bits of the operation result are written as $p_{j-1}$ in the memory 16, while the upper bits are loaded in the register c (line numbers 2.9 and 2.10). In the process for j=0 in the j-loop, c is reset to 0. Further, while j=0, the lower bits of the result obtained by the operation are not stored.

In the process on line 2.14, the data held by the c register is recorded as $p_m$ in the memory 16. And thereafter, the processes for P=P−n and for the transmission of data from MemA to MemB are the same as those in the second embodiment.

According to this embodiment, since two multipliers and three memories are provided, three variables can be read at the same time, and data reading can be performed by using two multipliers at the maximum.

The number of cycles required for this embodiment is as follows. Two cycles are required for the calculation of t in the i-loop, m cycles are required for the j-loop, and one cycle is required for the process for the pseudo code 2.x, so that a total of m+3 cycles is required for the process in the i-loop. The result m+3 is multiplied m times in accordance with the iterations of the i-loop, and for the number of cycles, $m^2+3m$ is obtained. Since $x_i$ and $y_j$ must be read during the cycle wherein i=0, even though $p_j$ need not be read, the subtraction of m is not required. In addition, 2m cycles are required for the comparison and inter-memory transmission process on line 2.14, and two cycles are required to exit the pipeline. Therefore, the final, required number of cycles is $m^2+5m+2$. Compared not only with the prior art but also with the first and second embodiments, the number of required cycles is drastically reduced. Since the term $m^2$ greatly affects the number of required cycles, especially when the value of m is increased, the effects produced by this embodiment are still more outstanding. And when the circuit for this embodiment is employed, the bottleneck that is encountered during memory access when two multipliers are employed can be eliminated, and the number of required cycles can be considerably reduced.

The present invention has been explained by referring to the embodiments; however, the invention is not limited to these embodiments, and can be variously modified without departing from the scope of the invention. For example, in the embodiments, single-port memories or two-port memories are is employed, but the invention can be also applied for three-port memories.

What is claimed is:

1. An arithmetic circuit comprising:
a plurality of registers;
an arithmetic unit, for regarding, as inputs, values entered in said multiple registers; and
a plurality of memories, wherein reading of multiple variables from said plurality of memories to said plurality of registers is performed during the same reading cycle by way of a pipeline process performed by said arithmetic unit said arithmetic unit being a multiplier adder for, based on values $x_1$, $x_2$, $x_3$ and $x_4$ having an r-bit length the are respectively input to a first register, second register, third register and fourth register, providing, in a single operational cycle, a result Q for $x_1 \cdot x_2 - x_3 + x_4$ having a length of 2r bits or 2r+1 bits.

2. The arithmetic circuit according to claim 1, wherein said multiple memories include a first memory and a second memory; and wherein, at a stage for writing an operation result, which follows the operation stage of said pipeline process, lower r bits $Q_L$ of said operation result Q are recorded in said first memory, and upper bits $Q_H$ of said operation result Q, excluding said bits $Q_L$, are recorded in said fourth register, while at a stage for reading variables from said registers, which follows said writing stage, simultaneously, a variable $x_1$ is read from said first memory and is stored in said first register, and a variable $x_3$ is read from said second memory and is stored in said third register.

3. The arithmetic circuit according to claim 2, wherein said first memory and said second memory are two-port memories having one data writing port and one data reading port.

4. The arithmetic circuit according to claim 2, wherein said first memory is a two-port memory having one data writing port and one data reading port, while said second memory is a single-port memory having one port for the writing and reading of data.

5. An arithmetic circuit comprising:
a plurality of register;
an arithmetic unit, for regarding, as inputs, values entered in said multiple registers; and
a plurality of memories, wherein reading of multiple variables from said plurality of memories to said plurality of registers is performed during the same reading cycle by way of a pipeline process performed by said arithmetic unit, said arithmetic unit being a multiplier adder for, based on values $x_1$, $x_2$, $x_3$, $x_4$ $x_5$ and $x_6$, having an r-bit length, that are respectively input to a first register, a second register, a third register, a fourth register, a register and a sixth register, and for providing, in a single operational cycle, the operation results Q for $x_1+x_2 \cdot x_3+x_4 \cdot x_5+x_6$, which have a length of 2r bits or 2r+1 bits.

6. The arithmetic circuit according to claim 5, wherein said multiple memories include first memory, a second memory and a third memory; wherein, at a stag for writing an operation result, which follows the operation stage of aid pipeline process, tower r bits $Q_L$ of said operation result Q are record d in said first memory, and upper bits $Q_H$ of said operation result, excluding said bits $Q_L$, are recorded in said sixth register; and wherein, at a stage for reading variables to said registers, which follows said writing stage, simultaneously, a variable $x_1$ is read from said first memory and is stored in said first register, a variable $x_3$ is read from said second memory and is stored in said third register, and a variable $x_5$ is read from said third memory and is stored in said fifth register.

7. The arithmetic circuit according to claim 6, wherein said first memory is a two-port memory having one data writing port and one data reading port, and aid second memory and said third memories are single-port memories having one port for the writing and the reading of data.

8. An arithmetic method using an arithmetic circuit that includes an arithmetic unit, which has multiple input registers and multiple memories, comprising the steps of:
performing an arithmetic operation based on values stored in said input registers;
writing the results of said arithmetic operation in said input registers or said memories; and
reading multiple variables from said multiple memories and storing said variables in said multiple input registers during the same pipeline stage,
said arithmetic unit being a multiplier adder for, based on values $x_1$, $x_2$, $x_3$ and $x_4$ having an r-bit length that are respectively input to a first register, a second register, third register and a fourth register, providing, in a single operational cycle, the operation results Q for $x_1+x_2 \cdot x_3+x_4$ having a length of 2r bits 2r+1 bits.

9. The arithmetic method according to claim 8, wherein said multiple memories include a first memory and a second memory, further comprising:
a writing step in a pipeline process of said arithmetic unit for recording, in said first memory, lower r bits $Q_L$ of said operation result Q, and for recording, in said fourth register, upper bits $Q_H$ of said operation result Q, excluding said bits $Q_L$; and
a reading step of performing, at the same reading stage in said pipeline process, the reading of a variable $x_1$ from said first memory and storing said variable $x_1$ in said first register, and the reading of a variable $x_3$ from said second memory and storing said variable $x_3$ in said third register.

10. The arithmetic method according to claim 9, wherein said first memory and said second memory are two-port memories having one data writing port and one data reading port.

11. The arithmetic method according to claim 9, wherein said first memory is a two-port memory having one data writing port and one data reading port, while said second memory is a single-port memory having one port for the writing and reading of data.

12. An arithmetic method using an arithmetic circuit that includes an arithmetic unit, which has multiple input registers and multiple memories, comprising the steps of:
performing n arithmetic operation based on values stored in said input registers;
writing the results of said arithmetic operation in said input register or said memories; and
reading multiple variables from said multiple memories and storing said variables in said multiple input registers during the same pipeline stage,
wherein said arithmetic unit is a multiplier adder for, based on values $x_1$, $x_2$, $x_3$, $x_4$ $x_5$ and $x_6$, having an r-bit length, that are respectively input to a first register, a second register, a third register, a fourth register, a fifth register and a sixth register, and for providing the operation results Q for $x_1+x_2 \cdot x_3+x_4 \cdot x_5+x_6$, which have a length of 2r bits or 2r+1 bits.

13. The arithmetic method according to claim 12, wherein said multiple memories include a first memory, a second memory and a third memory, further comprising:
a writing step in a pipeline process of said arithmetic unit for recording, in said first memory, lower r bits $Q_L$ of said operation result Q, and for recording, in said sixth register, upper bits $Q_H$ of said operation result Q, excluding said bits $Q_L$; and
a reading step of performing, at the same reading stage of said pipeline process, the reading of a variable $x_1$ from said first memory and storing said variable $x_1$ in said first register, the reading of a variable $x_3$ from said second memory and storing said variable $x_3$ in said third register, and the reading of a variable $x_5$ from said third memory and storing said variable $x_5$ in said fifth register.

14. The arithmetic method according to claim 13, wherein said first memory is a two-port memory having one data writing port and one data reading port, while said second and third memories are single-port memories having one port for the writing and reading of data.

* * * * *